United States Patent [19]

Chum

[11] Patent Number: 4,667,319

[45] Date of Patent: May 19, 1987

[54] DIGITAL REPEATER WITH 3-WAY BRANCHING OF SERVICE CHANNELS

[75] Inventor: Stanley P. K. Chum, Union City, Calif.

[73] Assignee: GTE Sprint Communications Corporation, Burlingame, Calif.

[21] Appl. No.: 759,716

[22] Filed: Jul. 29, 1985

[51] Int. Cl.[4] ............................ H04J 1/10; H04B 3/36
[52] U.S. Cl. ......................................... 370/55; 370/97
[58] Field of Search ................... 370/55, 97, 110.1, 58

[56] References Cited

U.S. PATENT DOCUMENTS 4,105,869  8/1978  Aueneau et al. ....................... 370/55
4,417,335  11/1983  Kelly et al. ............................ 370/58

Primary Examiner—Douglas W. Olms
Assistant Examiner—Curtis Kuntz
Attorney, Agent, or Firm—Douglas M. Gilbert

[57] ABSTRACT

A novel 3-way digital branching network located at a telecommunications repeater branches digital service channel signals into and out of the digital transmission system. On the drop side a first adder combines the West-to-East and East-to-West digital service channel signals before being converted to analog signals for use by the local service channel equipment. On the insert side the locally generated service channel signals are digitized and then digitally combined with the through path signals by a second and third adder for insertion into the West-to-East and East-to-West digital transmission paths.

6 Claims, 2 Drawing Figures

DIGITAL REPEATER WITH 3-WAY BRANCHING OF SERVICE CHANNELS

BACKGROUND OF THE INVENTION

1. Field of the Invention

This invention relates to digital telecommunications and more particularly, to a novel bi-directional 3-way branching apparatus to drop and insert service channels in a digital transmission system.

2. Background Description

In both analog and digital transmission systems, service channels carry voice (order wire), supervisory, alarm and control information between repeater locations and end terminals. The control and supervisory facilities require at least one master station (usually located at an end terminal) and slave stations (usually located at each repeater location). Status reporting from each repeater location often is accomplished by polling techniques wherein the supervisory equipment for each repeater station is assigned a unique address. When a repeater station receives a status request along with its particular address, it responds by transmitting the desired status information. The polling can be accomplished sequentially, in which case the information is regularly transmitted to the master station.

Usually service channel signals are connected to a digital transmission system at the VF (voice frequency) interface via an analog hybrid system (sometimes referred to as an analog branching unit) as illustrated in FIG. 1. Unfortunately this technique causes the through path service channel signals to be subjected to multiple A/D and D/A conversion (i.e. analog-todigital and digital-to-analog conversion) at each repeater location. Such conversion occurs independent of whether anything is dropped out or inserted at the repeater location. Such an operation degrades the overall service channel performance and adds an expense to the system.

It is a principal object of this invention to avoid a dual D/A and A/D conversion of digital service channel through path signals by performing the 3-way branching at a repeater in the digital domain.

SUMMARY OF THE INVENTION

In accordance with the teachings of the present invention, the problem of degraded performance inherent with a dual D/A and A/D conversion of the through path service channel carrier signals is overcome. The present invention is a 3-way digital branching network that functionally interfaces between the digital transmission facilities and the service channel equipment. A first binary adder provides the digital drop service channel signals by digitally combining the incoming service channel signals from both transmission path receivers, for example an East-to-West direction receiver and a West-to-East direction receiver. A single D/A converter converts the digital drop service channel signals to an analog format for use by the local service channel equipment. The other two adders digitally combine the locally generated service channel signals with the through path service channel signals from both transmission path receivers. An A/D converter digitizes the locally generated service channel signals before being combined with the through path digital signals.

BRIEF DESCRIPTION OF THE DRAWINGS

For a better understanding of the invention as well as other objects and further features thereof, reference is made to the following description which is to be read in conjunction with the accompanying drawings wherein.

DETAILED DESCRIPTION OF THE INVENTION

Figure 1:
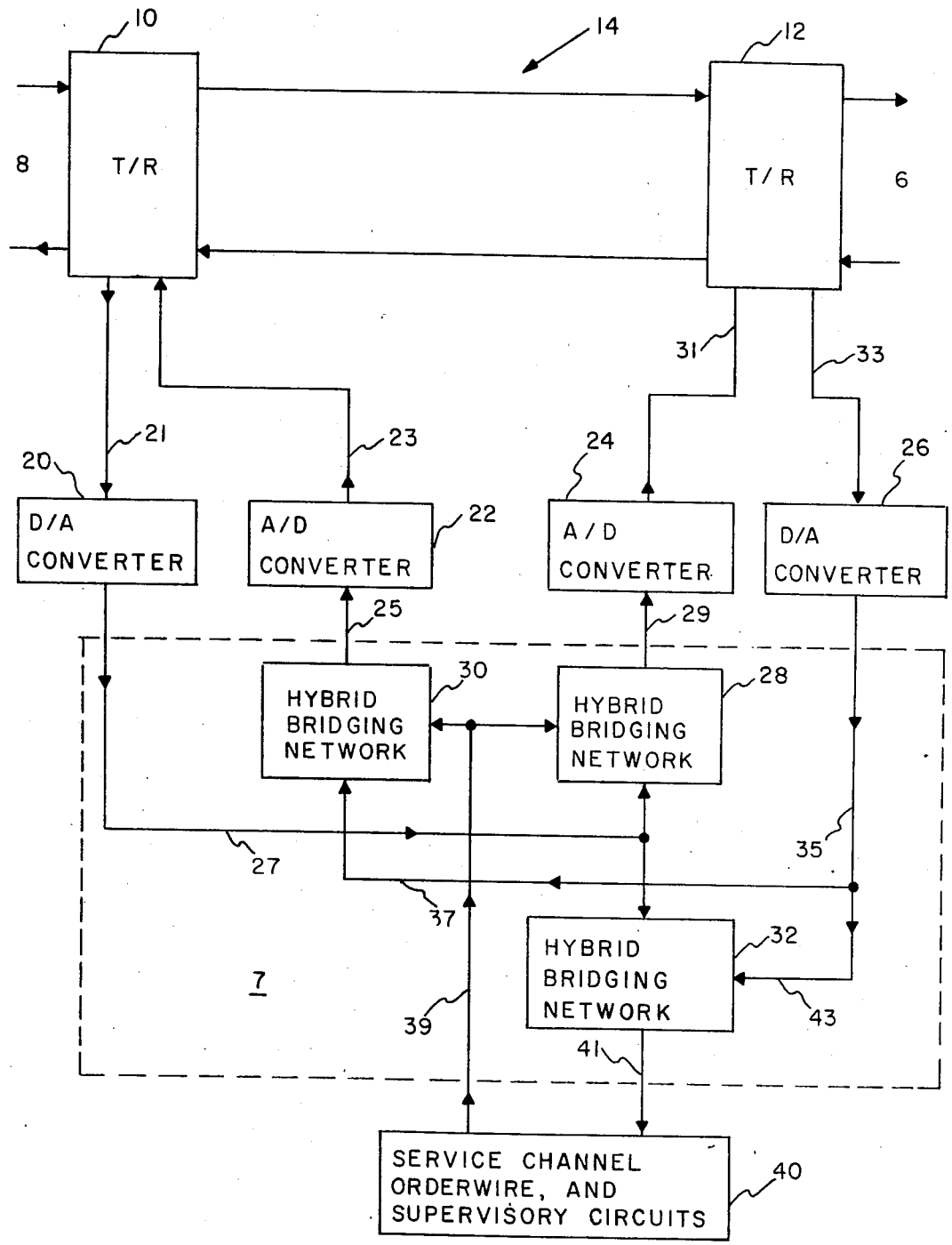
FIG. 1 is a simplified functional block diagram of an analog branching network illustrating one prior art technique to interface service channel facilities at a repeater station with a digital transmission facility.

The main transmission system consists of a West end terminal (not shown), an East end terminal (also not shown), and the repeater facility shown partially in block form in FIG. 1. T/R 10 includes an East-to-West transmitter and a West-to-East receiver that modulates and demodulates, respectively, the digital signals to frequencies compatible with the transmission path 8. Where path 8 is optical fiber, the T/R pair would be an optical transmitter/receiver to convert the signals to light waves for transmission over the optical fiber. Where path 8 is a microwave antenna link, T/R pair 10 would be a microwave radio transmitter/receiver pair. Also included within block 10 are digital multiplexers and demultiplexers that combine and separate the main digital signals which for example, could be 9-T3 PCM channel groups. Similarly, T/R 12 consists of a West-toEast transmitter, an East-to-West receiver, and multiplexers and demultiplexers for communications over path 6. T/R 12 is functionally equivalent to T/R 10. T/R 10 interconnects with T/R 12 via path 14. The digital signals on path 14 may or may not be down-converted demultiplexed signals depending upon the requirements at the repeater facility. In addition, although path 14 is shown as a direct connection, there may be other equipment bridging the line or separating out some of the digital signals.

T/R 10 separates out (demultiplexes) the West-to-East direction service channel signals from the through path signals passed to transmission path 14, and also combines (multiplexes) the service channel signals with the other digital signals to be transmitted over path 8. The service channel drop signal that appears on path 21 is typically a 64 kb/s data channel. This digital signal is immediately converted to an analog drop signal by D/A converter 20. Similarly T/R 12 separates out the East-to-West service channels received from path 6. This digital signal on path 33 is converted to an analog drop signal by D/A converter 26, and combined with the West-to-East direction drop signal on path 27 by hybrid bridging network 32. The combined analog service channel signals are then applied to the orderwire, supervisory and control equipment 40. The hybrid bridging networks 28, 30, and 32 are analog combiners and may be either active signal combiners or passive networks.

On the transmit side, the analog service channel insert signals on path 39 are split into a West and East path by networks 28 and 30. The West insert signals are combined with the East-to-West through path service channel signals on path 37, converted to a digital format by A/D converter 22, and applied to the West transmitter at T/R 10. Similarly the East insert signals are combined with the West-to-East through path service channel signals on path 27, converted to a digital format by A/D converter 24, and applied to the East transmitter at T/R 12.

It is apparent that a number of analog-to-digital and digital-to-analog conversions must be effected at each repeater station. Not only are four converters (two A/D and two D/A) required for this configuration but the through path service channel signals undergo two separate conversions whether or not any other data is to be dropped out or inserted. This introduces timing jitter which results in quantizing noise at the terminals which may be totally unacceptable over a long haul system.

Figure 2:
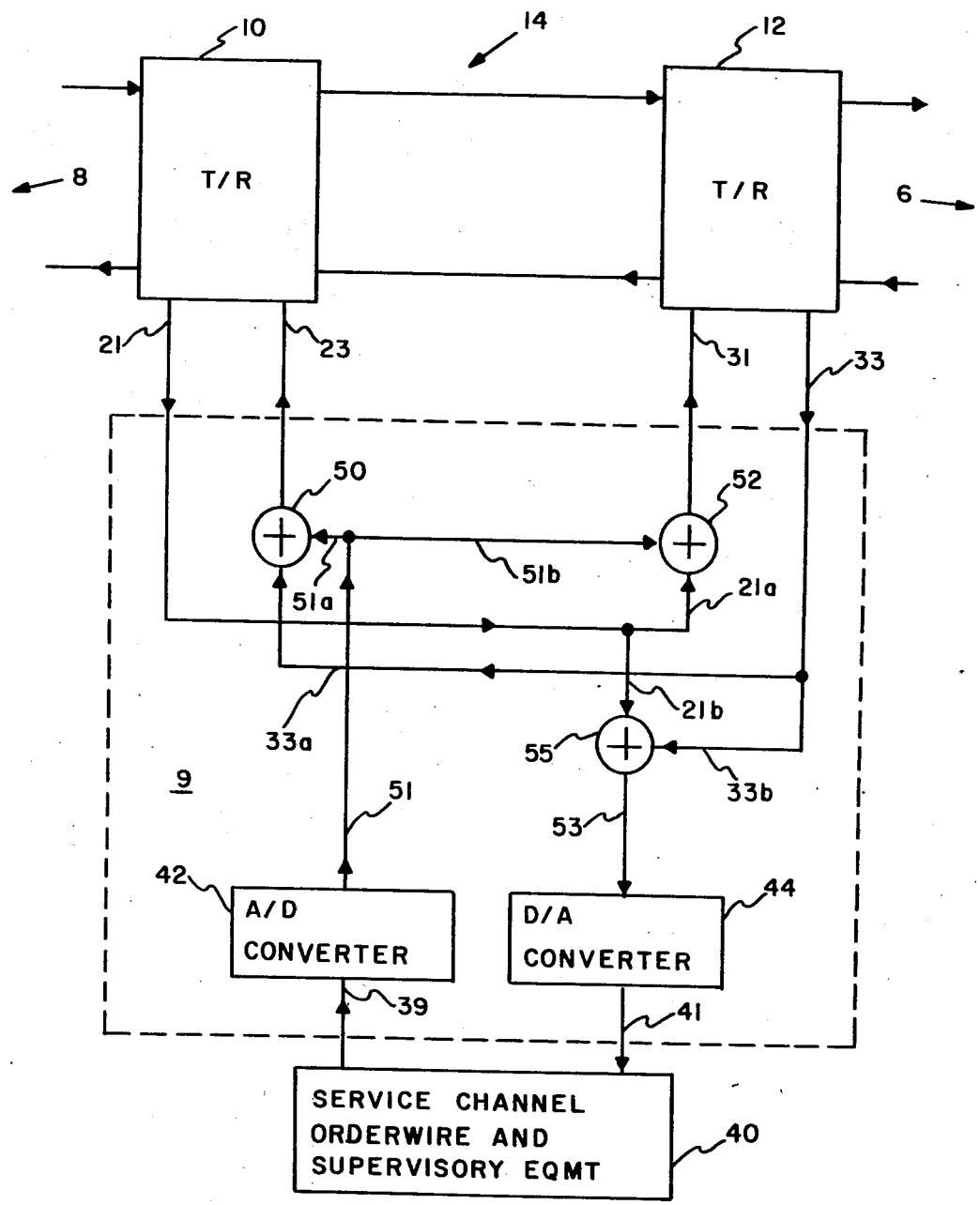
FIG. 2 is a combination block and schematic diagram of a digital branching network illustrating, in accordance with the instant invention, the preferred manner for interfacing the service channel facilities at a repeater station with a digital transmission facility.

In order to minimize the number of conversions, a novel branching circuit was devised and is shown in FIG. 2. Note that the West-to-East and East-to-West transmission equipment T/R 10 and 12 is the same in both figures. However, the A/D and D/A converters 20, 22, 24 and 26 and the analog branching circuit 7 have been replaced by the digital branching circuit 9. Thus, the service channel signals which are to be transmitted directly through the repeater are not subjected to two separate conversion steps as is true with the prior art technique. The functional operation of the 3-way branching network will now be described.

Referring now to FIG. 2 on the receive side, T/R 10 and T/R 12 separate out (demultiplex) the West-to-East and East-to-West direction service channel signals, respectively, from the through path signals. The two digital service channel drop signals appear on paths 21 and 33, and are applied to separate inputs of a standard 8-bit binary adder 55 i.e. an arithmetic adder, via paths 21b and 33b. Whatever appears on the inputs to adder 55 during the clocked time period is digitally added and converted to an analog signal by D/A converter 44 via path 53. Although the timing synchronization of the digital words from the various sources is very important particularly for adder 55, there are many implementations that could be used, most of which are fairly straightforward, and therefore, the timing circuitry is not shown in FIG. 2.

On the transmit side, the locally generated analog service channel signals on path 39 are immediately converted into a digital waveform by A/D converter 42. The digital output signal is split into a West and East path (51a and 51b) and applied to two other binary adders 50 and 52. The West insert signals are combined with the East-to-West through path service channel signals on path 33a, and the combined service channel signals are applied to the West transmitter at T/R 10 via path 23. Similarly the East insert signals (on path 51b) are combined with the West-to-East through path service channel signals on path 21a and applied to the East transmitter at T/R 12 via path 31.

In prior art systems supervisory data was branched at the VF (analog) domain because it was believed to be impossible to add two data bits together and to later separate them accurately or without interference between two data bytes sent at the same time. The 3-way branching network shown in FIG. 2 operates without any interference between orderwire signals and the supervisory equipment signals or between supervisory signals sent from various repeater locations. This is because of the way voice and supervisory data are transmitted from a repeater to end offices (terminals). Orderwire signals consist of one or more analog voice signal. If two people talk over the orderwire at the same time, the analog signals mix and arrive at the end terminal as two voice signals. (The job of seperating them is usually left to the human ear.) This occurs whether the service channel interface is analog, as in FIG. 1, or digital, as in FIG. 2. The only difference is that the digital interface mixes the signals on a digital basis rather than on an analog basis. The situation is the same when supervisory signals are added into the service channel spectrum.

Supervisory and control signals are usually some form of FSK (frequency shift keyed) carrier that is frequency multiplexed with other orderwire signals. Narrowband filters in the supervisory equipment select only the frequencies used. Therefore there is no reason that the orderwire and supervisory equipment should interfere with each other.

Supervisory equipment at different locations within a system have the potential for causing signal interference if the same FSK signals are being sent at the same time. However this is true whether the service channel interface is analog or digital. As is well known, the supervisory status information required from each repeater station is transmitted separately, often sequentially from each repeater station, on turn. A master station located at a terminal polls each individual supervisory station which reports upon command. Those stations not addressed do not transmit status information or in effect transmit a binary "0" state. Thus data that is sent from one originating repeater location to an end terminal would not be modified by any intermediate repeater station. This is because the other stations are sending binary "0's", and by binary addition the digital signal added to the line is unchanged by other signals present.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a digital communication transmission system including a transmission facility having a service channel, first and second receive ports for providing demodulated service channel signals from separate transmission paths, and first and second transmit ports for providing service channel signals to separate transmission paths, apparatus at a repeater for branching digital service channel signals into and out of the transmission system, said apparatus comprising:

A/D conversion means for converting analog input signals from local service channel facilities to digital output signals;

D/A conversion means for converting digital input signals into analog output signals for reception by said service channel facilities;

first adder means having first and second inputs and a first output, said first input connected to said first receive port, said second input connected to said second receive port, and said first output connected to said D/A conversion means, said adder means performing a digital addition of the received service channel signals at said first and second inputs;

second adder means having third and fourth inputs and a second output, said third input connected to said first receive port, said fourth input connected to said digital output signals from said A/D conversion means, and said second output connected to said second transmit port, said second adder means performing a digital addition of said locally generated service channel signals with said service channel signals from one of said transmission paths;

third adder means having fifth and sixth inputs and a third output, said fifth input connected to said second receive port, said sixth input connected to said digital output signals from said A/D conversion means, and said third output connected to said first transmit port, said third adder means performing a digital addition of said locally generated service channel signals with said service channel signals from the other of said transmission paths.

2. Apparatus as in claim 1 wherein each of said adder means further comprises a binary adder coupled to a buffer.

3. In a digital communication system having a voice/data service channel facility, a West terminal, an East terminal, and a repeater including an East-to-West and West-to-East digital transmission system, apparatus at the repeater for digitally coupling the digital through path service channel signals to the corresponding East-to-West and West-to-East path transmission systems, and for coupling the drop and insert signals with the East-to-West and West-to-East path transmission equipment, said interface apparatus comprising:

means for dropping said service channel signals from said W-E and E-W transmission system to the service channel repeater facility, said dropping means comprising:

first adder means responsive to the digital signals from said W-E transmission system and said E-W transmission system for generating a digital signal representative of the sum of the West-to-East and East-to-West drop service channel signals;

D/A conversion means responsive to said summed West-to-East and East-to-West drop service channel signals for generating an analog drop signal representative of the sum of the West-to-East and East-to-West drop service channel signals;

means for combining said service channel signals from said repeater facility with said West-to-East and East-to-West service channel through path signals for insert into said West-to-East and East-to-West transmission system, said combining means comprising:

A/D conversion means responsive to the analog insert service channel signals from said repeater facility for generating a digital insert signal representative of the analog insert service channel signals;

second adder means responsive to the digital insert signals and the West-to-East through path service channel signals for generating a digital signal representative of the sum of the West-to-East through path service channel signals and the digital insert signals for connection to said West-to-East repeater transmission equipment; and third adder means responsive to the digital insert signals and the East-to-West through path service channel signals for generating a digital signal representative of the sum of the East-to-West through path service channel signals and the digital insert signals for connection to said East-to-West repeater transmission equipment.

4. Apparatus as set forth in claim 3 wherein said D/A conversion means further comprises a digital-to-analog converter.

5. Apparatus as set forth in claim 3 wherein said A/D conversion means further comprises an analog-to-digital converter.

6. Apparatus as set forth in claim 3 wherein said first, second, and third adder means each further comprises a binary adder.

* * * * *